United States Patent [19]
Yoshida et al.

[11] Patent Number: 6,050,110
[45] Date of Patent: Apr. 18, 2000

[54] METHOD FOR MANUFACTURING GLASS PRODUCT

[75] Inventors: Masahiro Yoshida, Saitam; Lihong Zhang; Teruo Yamashita, both of Tokyo; Yoshiatsu Yokoo, Saitama; Ken Uno, Tokyo, all of Japan

[73] Assignee: Hoya Corporation, Tokyo, Japan

[21] Appl. No.: 08/998,068

[22] Filed: Dec. 24, 1997

[30] Foreign Application Priority Data

Dec. 26, 1996 [JP] Japan ................................. 8-348536

[51] Int. Cl.⁷ ............................ C03B 37/15; G02B 6/255
[52] U.S. Cl. ............................. 65/406; 65/404; 65/408; 264/1.25; 264/2.5
[58] Field of Search ......................... 65/102, 106, 111, 65/404, 406, 407, 408; 264/2.5, 1.25

[56] References Cited

U.S. PATENT DOCUMENTS

| | | | |
|---|---|---|---|
| 4,778,505 | 10/1988 | Hirota et al. | 65/102 |
| 5,049,177 | 9/1991 | Nakata | 65/93 |
| 5,228,894 | 7/1993 | Sato et al. | |
| 5,264,016 | 11/1993 | Komiyama | 65/102 |
| 5,282,878 | 2/1994 | Komiyama et al. | 65/102 |
| 5,340,374 | 8/1994 | Komiyama et al. | 65/102 |
| 5,425,118 | 6/1995 | Sugihara et al. | |
| 5,706,378 | 1/1998 | Suzuki et al. | |
| 5,766,294 | 6/1998 | Takagi et al. | 65/111 |

FOREIGN PATENT DOCUMENTS

| | | |
|---|---|---|
| 0 356 068 | 2/1990 | European Pat. Off. . |
| 0 508 066 | 10/1992 | European Pat. Off. . |
| 62-041731 | 7/1987 | Japan . |
| 62-128932 | 11/1987 | Japan . |

*Primary Examiner*—Stanley S. Silverman
*Assistant Examiner*—Michael P. Colaianni
*Attorney, Agent, or Firm*—Burns, Doane, Swecker & Mathis, L.L.P.

[57] ABSTRACT

A manufacturing method for a glass product not having a rotatively symmetric body like an optical fiber fixing member but having a fine structure as of optical fiber engagement portions, to transfer the fine structure with a high precision without creating molding burrs, includes the steps of placing a glass material in a cavity defined by a lower mold, an upper mold, and a side mold, molding the glass material in the cavity with pressure into the glass product in so controlling that the glass material has a viscosity range of $10^{6.5}$ to $10^{9.5}$ poises at the beginning of molding operation with pressure, that the lower mold is at a temperature in a range such that the glass material indicates the above viscosity range, and that the upper and side molds are at a temperature in a range such that a converted viscosity of the glass material at the temperature of the upper and side molds is 5 to 100 times higher than the viscosity of the glass material at the temperature of the lower mold, and decreasing the temperature of the lower mold at the same time that or after the glass product begins to be molded with pressure. To produce an optical fiber fixing member, the lower mold has a mold face for molding optical fiber engagement portions of the optical fiber fixing member; the upper mold has a mold face for molding a bottom of the optical fiber fixing member; and the side mold has a mold face for molding a side face of the optical fiber fixing member.

5 Claims, 6 Drawing Sheets

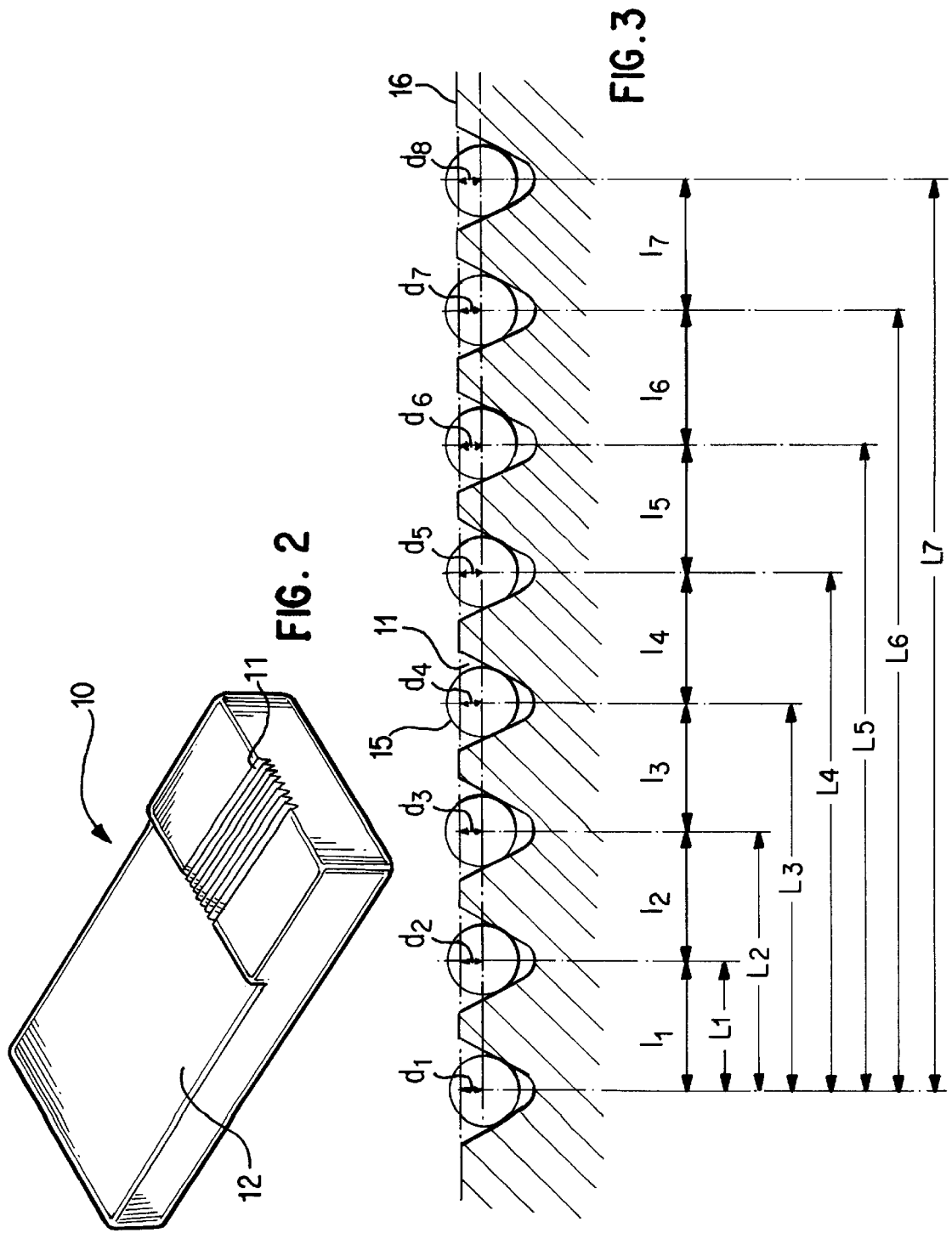

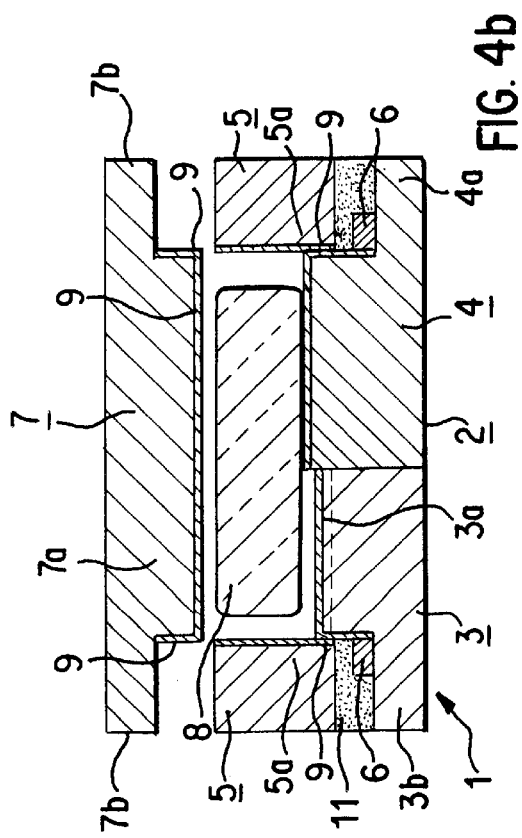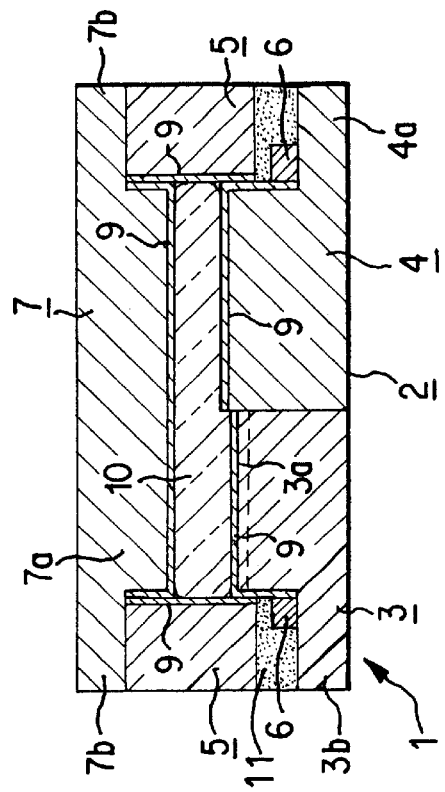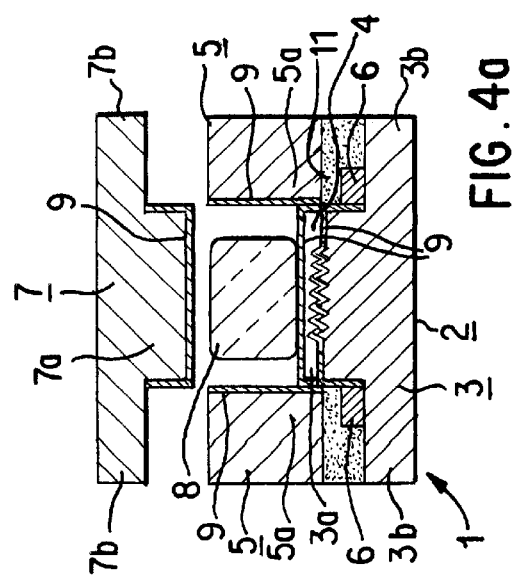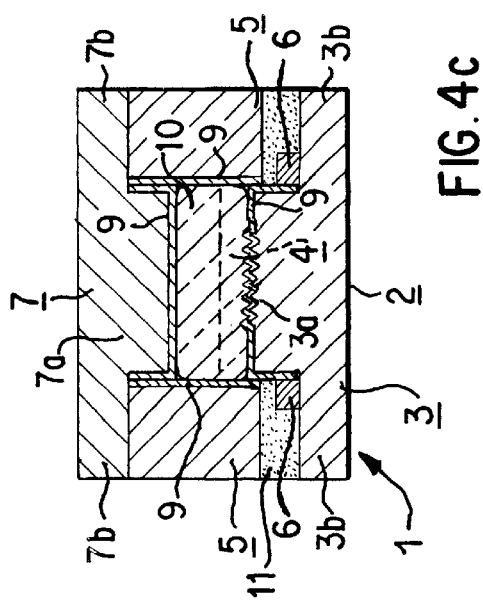

METHOD FOR MANUFACTURING GLASS PRODUCT

BACKGROUND OF THE INVENTION

1. Field of the Invention

This invention relates to a molding method capable of molding a glass product with high precision of a fine structure without creating molding burrs, even if the glass product has a weak symmetry as of an optical fiber fixing member and the fine structure such as an optical fiber engagement portions.

2. Description of Related Art

An optical fiber used for optical communication is generally a fine glass fiber. For example, a quartz single mode optical fiber used for long distance optical communication is constituted of a core having an outer diameter of about 10 micron meters and a clad covering the core and having an outer diameter of 125 micron meters. A quartz multi-mode optical fiber is constituted of a core having an outer diameter of 50 to 100 micron meters and a clad covering the core and having an outer diameter of 125 micron meters. Accordingly, high alignment precision is required to reduce a connection loss at optical connecting points when optical fibers are optically connected to each other or when an optical fiber is optically connected to an optical device such as an optical waveguide, a lens, an light emitting device, a photo-receiving device, etc. In particular, optical connections between quartz single mode optical fibers and between a quartz single mode optical fiber and a quartz glass single mode optical waveguide require a high alignment precision of around ±1 micron meter.

To optically connect an optical fiber with another optical fiber or optical device, the optical fiber is fixed in advance by an optical fiber fixing member such as an optical connector or optical fiber array. The optical fiber array here means a member at least including an optical fiber guide block and a fiber fixing lid. The optical fiber guide block is made of a thin plate formed with engagement portions for fixing optical fibers to position the optical fibers. The fiber fixing lid is made of a thin plate for pressing the optical fibers engaging with the engagement member to fix the optical fibers. For example, Japanese Unexamined Patent Publication, Heisei No. 7-5,341 discloses an optical fiber array for fixing a tape fiber in which plural optical fibers arranged in a row are protected by a resin cover. This optical fiber array is shown in FIG. 7.

As shown in FIG. 7, the optical fiber array 200 includes an optical fiber guide block 204 and a fiber fixing lid for optical fibers 205. The optical fiber guide block 204 is a block in a thin plate shape on which a prescribed number of V-shaped grooves 203 serving as engagement portions for fixing optical fibers are formed for fixing optical fibers 202 striped from a tape fiber 201. The fiber fixing lid 205 for optical fibers is a block in a thin plate shape to press the optical fibers to fix the optical fibers 202 engaged with the V-shaped grooves 203. The optical fiber guide block 204 constituting the optical fiber array 200 has, in addition to the V-shaped grooves 203, a seat 207 for fixing a covered portion 206 of the tape fiber 201. The seat 207 is formed at a position lower than the V-shaped grooves 203. The optical fiber array 200 includes a fiber fixing lid 208 having a prescribed cross section to securely hold the covered portion 206 fixed at the seat 207.

To optically connect optical fibers fixed by optical fiber fixing members such as optical connectors and optical fiber arrays with each other or connect optical fibers fixed by an optical fiber fixing member with an optical device under a high alignment precision, an active alignment is conventionally used in using a precision stage. The active alignment is implemented in the following manner, for optical fibers fixed by optical fiber arrays and connected with each other, First, an optical fiber array to which optical fibers are fixed (hereinafter referred to as "optical fiber array A") is fixed to a holder on a precision stage, and another optical fiber array to which optical fibers are fixed (hereinafter referred to as "optical fiber array B") is fixed to another holder on the precision stage. Light is made to enter in an optical fiber fixed on the optical fiber array A from an optical fiber end in opposition to an optical connection side end (end positioned on a side where the optical fiber array is connected to another optical fiber array or optical device, between the opposing ends of the optical fiber) of the optical fiber array A, and an optical detector is set at an end located in opposition to the optical connection side end in the optical fiber array B. Then, the precision stage is scanned over a wide range to explore a position at which the optical detector detects optical power even of a small amount (this stage is referred to as "first step"). Then, the precision stage is scanned by a very small distance as to pick up the maximum optical power by the optical detector, thereby obtain the aimed high precision alignment (this stage is referred to as "second step").

Because a considerable time is required to scan the stage over the wide range at the first step during the active alignment, it is desirable to substantially complete the first step when the optical fiber fixing member is fixed to the stage's holder to make the high precision alignment easy. To do so, it is desired that the optical fiber engagement portions on the optical fiber fixing member is built with high precision, as well as that the optical fiber engagement portions are built with high precision such that positional precision, when measured in reference with the bottom face or side face of the optical fiber fixing member, are within ¹⁄₁₀ or less of the core diameter of the optical fibers to optically connected in use of the optical fiber fixing member. For example, in the case where quartz single mode optical fibers having a core diameter of around 10 micron meters are optically connected to each other, or in the case where a quartz single mode optical fiber is connected to a quartz glass single mode optical waveguide, the positional precision is desirably within 10 micron meters or less, and if the positional precision is within 5 micron meters or less, the alignment can be done easily.

When the position precision is reduced to about ¹⁄₁₀ or less of the core diameter of the optical fibers, the fibers can be optically connected by a passive alignment The passive alignment is an alignment method for mechanically adjusting the positions of the optical fiber fixing members or the fixing member and an optical device, using the side or bottom faces of the optical fiber fixing members as reference faces without detecting light entering into and emerging from the optical fibers. Thus, the optical fiber fixing members such as optical fiber arrays are required to have a high precision not only of the engagement portions for optical fibers for fixing the arranged optical fibers but also of the side or bottom face used as reference faces for alignment.

Glass, ceramic, silicon, resin, etc. are used as a material constituting a member for fixing optical fibers (hereinafter referred to as "optical fiber fixing member") such as optical fiber array or the like. Ultraviolet ray setting type adhesives having good property for work are desirable for fixing the fiber fixing lid on the optical fiber guide block and for connecting the optical fiber array with other optical fiber array or the like. Therefore, glasses having good ultraviolet transparency are getting favored as a material for optical fiber arrays. An optical fiber guide block required to have a high precision in size at optical fiber engagement portions, among optical fiber fixing members, has been fabricated by mechanically processing a glass block and the like in use of a dicing saw, diamond hone, etc. Such a fabrication process, however, raises a problem about mass production, production costs, and yields.

A method applying a method for molding optical glass lens has been known as a mass production method for optical fiber fixing members with lower costs. For example, Japanese Unexamined Patent Publication, Heisei No. 6-201,936 discloses a method for pressing a transparent material such a glass plate or the like with a high temperature by a mold having projections for forming grooves. Japanese Unexamined Patent Publication Heisei No. 7-218,739 discloses that a pitch precision at a molded optical fiber engagement portions is within 0.5 micron meter or less, a high precision. Japanese Unexamined Patent Publication Heisei No. 8-211,244 discloses a molding method for optical fiber fixing member using a glass containing no lead and having a low softening point.

Any of those methods is for molding an optical fiber fixing member. Those publications, however, do not disclose any means for improving precision of optical fiber engagement portions for fixing optical fibers orderly placed and of a side or bottom face as a reference face for alignment, and merely use a method, no more than a converted method for molding optical glass lenses.

Many optical fiber fixing member have a thin plate shape having a rectangular form when viewed from the top. Optical fiber engagement portions are formed at a portion of the thin plate and have a gap portion used as a seat. The optical fiber fixing members thus require a high molding precision, though it is very hard to mold such a fixing member in comparison with molding of lenses because the optical fiber fixing members thus have a shape of a weak symmetry. Therefore, even if a conventional molding technique for molding optical glass lenses applies for molding fixing members as it is, a useful optical fiber fixing member may not be molded. Particularly, to make higher the precision of the side or bottom face serving as reference faces for alignment, it is required to suppress molding burrs from occurring. The publications above, however, contain no disclosure about a method for suppressing molding burrs. In molding of optical lenses, some proposal has a method for suppressing molding burrs. However, as described below, those methods cannot be used, as they are, for molding optical fiber fixing members.

In regard with molding of an optical lens, it has been known that, as disclosed in Japanese Unexamined Patent Publication No. 60-118,642, substantially cylinder or sphere glass is used as a molding preform, and a mold including an upper mold, a lower mold, and a side mold is used. When such a glass preform is heated at a molding temperature and molded with pressure, the glass preform is extended coaxially and uniformly to fill the cavity of the mold. Setting the volume of the glass preform to a volume a little smaller than the cavity may prevent glass's encroachments into clearances between the side mold and the upper and lower mold, or namely, molding burrs. Moreover, as shown in FIG. 4 in the Publication, to make management for the glass preform's volume easy, some glass escaping portions are formed at portions optically not raising any problem, thereby preventing molding burrs.

In Japanese Patent Publication Heisei No. 6-15,414, and Japanese Patent Publication Heisei No. 6-17,240, disclosed are methods for molding glass lenses in preventing molding burrs by providing temperature differences among respective molds, the upper, lower, and side molds. Giving temperature differences differentiates glass transformation speeds at contact portions of the upper and lower molds, and controlling the glass' volume at a fixed amount or less brings glass unfilled portions raising no optical problem and consequently prevents molding burrs from occurring.

Japanese Unexamined Patent Publication, Showa No. 62-252,331 discloses a molding method for glass lens in which a mold material having a relation that thermal expansion coefficient of the glass material is larger than the thermal expansion coefficient of the mold material, which is larger than the thermal expansion coefficient of the side mold. According to this method, the thermal expansion coefficient differences between the mold and side mold makes the clearances between the side mold and the upper and lower molds smaller than those at a room temperature, thereby preventing molding burrs.

Any of such molding burr suppressing methods known for molding methods for glass lens has a premise that the glass preform spreads in the mold cavity uniformly. That is, the molding burrs can be prevented because the optical lens is a rotary symmetric body, and therefore, the horizontal cross section of the side mold is circle, and because unfilled portion of the glass can be made around clearances adjacent to the side mold.

Optical fiber fixing members, however, have weak symmetry in shapes. Therefore, it is unlikely that the glass spreads without contacting to the side mold at all. For example, even if a glass preform having a proximate shape to the optical fiber fixing member is used, edges, though originally the rectangular glass preform, may be rounded during application of pressure and expand horizontally to transform the preform. Therefore, for example, the glass at a projected portion can reach a side mold wall due to pressure and may cause molding burrs, but at the other portions the glass may create an unfilled situation in which the glass does not reach the side mold wall. If a whole form is made up by filling the glass even to the unfilled portions, the molding burrs are made more larger. Uneven glass extension becomes more outstanding as the products have weaker symmetry, and when the thickness of the products is not uniform, likewise a gap at the seat, such uneven extension becomes more outstanding. The molding burrs thus created may result in glass garbage, tending to raise problems when the product is produced massively. Although a trimming process of molding burrs is possible in a technical sense, it is not favorable because it may cause higher costs.

As described above, the optical fiber fixing member is required to be molded with a high precision with respect to any of the molded face for optical fiber engagement portions, the side face, and the bottom face. Particularly, the optical fiber engagement portions are required to elevate the molding precision on the side of the optical connection side end as within ±1 micron meter or less to reduce optical connection loss. To increase molding precision, if the glass is filled more into the mold cavity, more molding burrs may be created. If the optical connection side end has molding burrs, the optical fiber would be mounted on the molding burrs when inserted, so that the optical fiber cannot be aligned on the optical fiber engagement portion with high precision. The cross-sectional shape of the optical connection side end of the optical fiber fixing member desirably has a precise rectangular shape to improve alignment precision and to fix the end with other optical device by adhesive. If the edge of the molded face of the optical fiber engagement portions has molding burrs, however, the fiber fixing lid may be mounted on the molding burrs, thereby preventing the optical fibers from fixed with a high precision. If the corner on a side of the bottom has molding burrs, the optical fiber fixing member cannot be fixed to the holder for alignment, or precision stage's holder, with a high precision, thereby disabling the alignment process. As described above, for the optical fiber fixing member, any molding burr at almost all corners of the optical fiber fixing member should not be allowed while spaces around the optical connection side end have to be filled as mush as possible.

Thus, in molding items not formed of a rotary symmetric body, such as optical fiber fixing members, it is unlikely that the pressurized glass contacts uniformly to the molding face of the side mold, even though the glass must be filled in spaces around the optical connection side end. Hence, a molding technique is required in which no molding burr occurs even while the glass is filled well in spaces around the optical connection side end by raising the glass' filling degree in the mold cavity. Furthermore, the optical fiber fixing member has a fine structure at the optical fiber engagement portions. The fine structure is required to be formed with a high precision, and glass filling impairments in the optical fiber engagement portions would result in a fatal defect. A molding technique capable of molding such a fine structure of the optical fiber fixing member is especially required notwithstanding high or low glass' filling degree in the mold cavity.

SUMMARY OF THE INVENTION

It is an object of the invention to provide a method capable of transferring a fine structure with a high precision without creating any molding burrs even if molding a glass product of rotatively asymmetric body, as of an optical fiber fixing member, having a fine structure such as optical fiber engagement portions.

It is another object of the invention to provide a method capable of transferring, with a high precision, a fine structure of a glass product having the fine structure such as optical fiber engagement portions, as of an optical fiber fixing member.

In one form of the invention, a manufacturing method for a glass product includes the steps of: placing a glass material in a cavity defined by a lower mold, an upper mold, and a side mold; molding the glass material in the cavity with pressure into the glass product in so controlling that the glass material has a viscosity range of $10^{6.5}$ to $10^{9.5}$ poises at the beginning of molding operation with pressure, that the lower mold is at a temperature in a range such that the glass material indicates the above viscosity range, and that the upper and side molds are at a temperature in a range such that a converted viscosity of the glass material at the temperature of the upper and side molds is 5 to 100 times higher than the viscosity of the glass material at the temperature of the lower mold; and decreasing the temperature of the lower mold at the same time that or after the glass product begins to be molded with pressure.

According to a preferred embodiment, the temperature of the lower mold at the end of molding is of $10^8$ to $10^{10}$ poises when converted to the viscosity of the glass material. The glass product may have a number, which is eight or less, of symmetric faces extending parallel to a pressure application direction of the pressure. The glass product may have edges of 100 micron meters or less in size, formed between faces molded with pressure by the lower and side molds and/or between faces molded with pressure by the top and side molds. The glass product may have asymmetric thickness with respect to the gravity center position of the glass product when viewed in a pressure application direction. The glass product may have a fine structure, and a molding face of the lower mold has a fine structure to be transferred for the fine structure of the glass product. The glass product can be an optical fiber fixing member. The lower mold may have a molding face for molding an optical fiber engagement portion of an optical fiber fixing member, and the upper mold has a molding face for molding a bottom of the optical fiber fixing member, while the side mold may have molding faces for molding side faces of the optical fiber fixing member.

In another aspect of the invention, a manufacturing method for a glass product includes steps of: placing a glass material in a cavity formed of at least, a lower mold and an upper mold, either one of which has a fine structure for transferring a fine structure onto the glass product; molding the glass material in the cavity with pressure into the glass product in so controlling that the glass material has a viscosity range of $10^{6.5}$ to $10^{9.5}$ poises at the beginning of molding operation with pressure, that the mold having the fine structure is at a temperature in a range such that the glass material indicates the above viscosity range, and that the mold not having the fine structure is at a temperature in a range such that a converted viscosity of the glass material at the temperature of the mold not having the fine structure is 5 to 100 times higher than the viscosity of the glass material at the temperature of the mold having the fine structure.

According to a preferred embodiment, the mold having the fine structure may be the lower mold. The glass product can be an optical fiber fixing member. The lower mold has a molding face for molding an optical fiber engagement portion of an optical fiber fixing member, and the upper mold has a molding face for molding a bottom of the optical fiber fixing member.

In another aspect of the invention, a method for manufacturing an optical fiber array further includes, in addition to the steps of the above invented manufacturing method of the optical fiber fixing member, the step of fixing an end of an optical fiber with an adhesive by means of the optical fiber engagement portion of the optical fiber fixing member and a fiber fixing lid.

BRIEF DESCRIPTION OF THE DRAWINGS

The above and other objects and features of the invention are apparent to those skilled in the art from the following preferred embodiments thereof when considered in conjunction with the accompanied drawings, in which:

FIG. 2 is a perspective view showing an optical fiber guide block fabricated by the molding method according to the invention;

FIG. 3 is an enlarged cross-sectional view showing an optical fiber engagement portions of the optical fiber guide block fabricated by the molding method according to the invention;

FIGS. 4(a) to 4(d) are illustrations showing a mold used for a molding method according to the invention and the molding method itself;

DETAILED DESCRIPTION OF PREFERRED EMBODIMENTS

Figure 1A:
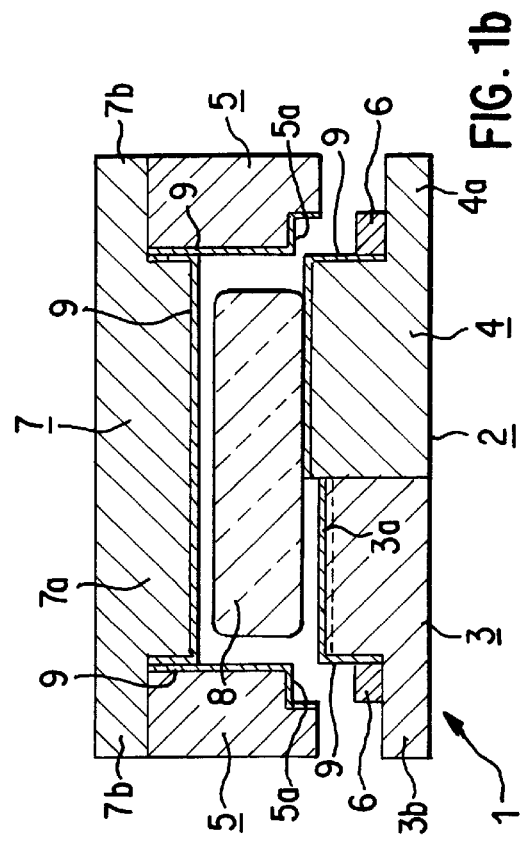
FIGS. 1(a) to 1(d) are illustrations showing a mold used for a molding method according to the invention and the molding method itself.

Hereinafter, this invention will be described.

A manufacturing method for a glass product according to a first embodiment of the invention is a method for molding a glass material with pressure in a cavity defined by a lower mold, an upper mold, and a side mold. There is no specific limitation to shapes and structures of the lower mold, the upper mold, and the side mold to be used. There is no specific limitation to the glass material, and the glass material can be selected from glass species suitable for a target glass product in the light of easiness for molding with pressure.

A first feature of the manufacturing method for a glass product according to the first embodiment of the invention resides that the glass material has a viscosity range of $10^{6.5}$ to $10^{9.5}$ poises at the beginning of molding operation with pressure, that the lower mold is at a temperature in a range such that the glass material indicates the above viscosity range, and that the upper and side molds are at a temperature in a range such that a converted viscosity of the glass material at the temperature of the upper and side molds is 5 to 100 times higher than the viscosity of the glass material at the temperature of the lower mold.

If the viscosity of the glass material at the beginning of molding operation with pressure exceeds $10^{9.5}$ poises, the glass is hardly molded with pressure, and particularly, in the case of the glass product having a fine structure, it is very hard to make a transfer with a high precision. On the other hand, if the viscosity of the glass material at the beginning of molding operation with pressure is lower, molding with pressure can be implemented easily, but it is appropriate to have $10^{6.5}$ poises or more in the light of suppression of molding burrs and durability or productivity (thermal efficiency) of the mold. Particularly, from a viewpoint to a fine structure transfer with a high precision and suppression of molding burrs, the viscosity of the glass material at the beginning of molding operation with pressure is preferably in a range of $10^7$ to $10^{8.5}$ poises.

The lower mold is at a temperature in a range such that the glass material indicates the above viscosity range ($10^{6.5}$ to $10^{9.5}$ poises). This is because if within this temperature range, molding with pressure can be performed easily, and the fine structure can be transferred with a high precision. When the glass product has a fine structure, a transfer molding can be performed by providing, on a molding face of the lower mold, a fine structure for transferring the fine structure onto the glass product.

The upper and side molds are at a temperature in a range such that a converted viscosity of the glass material at the temperature of the upper and side molds is 5 to 100 times higher than the viscosity of the glass material at the temperature of the lower mold. When the temperature of the upper and side molds exceeds a temperature such that a converted viscosity of the glass material is 5 times higher than the viscosity of the glass material, molding burrs would be hardly suppressed. When the temperature is less than a temperature such that a converted viscosity of the glass material is 100 times higher than the viscosity of the glass material, transformation of the glass material would be so greatly disturbed as to render molding hard. The temperature of the upper and side molds is preferably set to a temperature such that a converted viscosity of the glass material is 10 to 50 times higher than the viscosity of the glass material.

A second feature of the manufacturing method for a glass product according to the first embodiment of the invention resides that the temperature of the lower mold is decreased at the same time that or after the glass product begins to be molded with pressure. The temperature of the lower mold at the time that the glass product begins to be molded with pressure is a temperature in a range indicating the above viscosity range of the glass material. Though the method, therefore, can transfer the fine structure with a high precision, the molding burrs should be suppressed as molding with pressure goes on. To do so, the temperature of the lower mold is decreased at the same time that or after the glass product begins to be molded with pressure. The start of lowering the temperature is at the same time that or a prescribed time after the glass product begins to be molded with pressure in consideration of the viscosity (temperature) of the glass material, the temperature of the lower mold at the time that the glass product begins to be molded with pressure, proceedings of molding of the fine structure, etc. The temperature of the lower mold is desirably reduced to around the temperature of the upper and side molds or less.

According to the first embodiment of the invention, for example, the glass product having a number, which is eight or less, of symmetric faces extending parallel to a pressure application direction of the pressure, can be formed without producing any molding burrs and with a transferred fine structure of a high precision. The glass product having edges of 100 micron meters or less in size, formed between faces molded with pressure by the lower and side molds and/or between faces molded with pressure by the top and side molds can be molded well. The glass product having asymmetric thickness with respect to the gravity center position of the glass product when viewed in a pressure application direction, also can be molded well. As such a glass product, e.g., an optical fiber fixing member can be exemplified.

A manufacturing method for a glass product according to a second embodiment of the invention is a method for manufacturing a glass product by molding a glass material with pressure in a cavity formed of, at least, a lower mold and an upper mold, wherein a molding face of either one of the lower mold or upper mold has a fine structure for transferring a fine structure onto the glass product.

A first feature of the manufacturing method for a glass product according to the second embodiment of the invention resides that the glass material has a viscosity range of $10^{6.5}$ to $10^{9.5}$ poises at the beginning of molding operation with pressure, that the mold having a fine structure molding face is at a temperature in a range such that the glass material indicates the above viscosity range, and that the mold not having a fine structure molding face is at a temperature in a range such that a converted viscosity of the glass material at the temperature of the mold not having a fine structure molding face is 5 to 100 times higher than the viscosity of the glass material at the temperature of the mold having a fine structure molding face.

If the viscosity of the glass material at the beginning of molding operation with pressure exceeds $10^{9.5}$ poises, the glass is hardly molded with pressure, and in the case of the glass product having a fine structure, it is very hard to make a transfer with a high precision. On the other hand, if the viscosity of the glass material at the beginning of molding operation with pressure is lower, molding with pressure can be implemented easily. However, it is practically appropriate to have $10^{6.5}$ poises or more in the light of suppression of molding burrs and durability or productivity (thermal efficiency) of the mold. Particularly, from a viewpoint to a fine structure transfer with a high precision and suppression of molding burrs, the viscosity of the glass material at the beginning of molding operation with pressure is preferably in a range of $10^7$ to $10^{8.5}$ poises.

The mold having a fine structure molding face is at a temperature in a range such that the glass material indicates the above viscosity range ($10^{6.5}$ to $10^{9.5}$ poises). This is because if within this temperature range, molding with pressure can be performed easily, and the fine structure can be transferred with a high precision. Although the mold having the fine structure molding face can be either the lower mold or the upper mold, for a viewpoint to perform transfer molding in a better way, it is desirable to form, on the molding face of the lower mold, a fine structure for transferring the fine structure onto the glass product.

The mold not having a fine structure molding face is at a temperature in a range such that a converted viscosity of the glass material at the temperature of the mold not having a fine structure molding face is 5 to 100 times higher than the viscosity of the glass material at the temperature of the mold having a fine structure molding face. When the temperature of the mold not having a fine structure molding face exceeds a temperature such that a converted viscosity of the glass material is 5 times higher than the viscosity of the glass material at the temperature of the mold having a fine structure molding face, the glass material spreads widely in the mold cavity rather than fills over the fine structure molding face, so that the fine structure cannot be transferred and bring an unfavorable result. When the temperature is less than a temperature such that a converted viscosity of the glass material is 100 times higher than the viscosity of the glass material, transformation of the glass material are so greatly disturbed as to render molding hard. The temperature of the mold not having a fine structure molding face is preferably set to a temperature such that a converted viscosity of the glass material at the temperature of the mold not having a fine structure molding face is 10 to 50 times higher than the viscosity of the glass material at the temperature of the mold having a fine structure molding face.

It is to be noted that in the manufacturing method according to the second embodiment of the invention, a side mold or the like can be used in addition to the lower and upper molds.

The manufacturing method according to the second embodiment of the invention allows such a glass product such as an optical fiber fixing member to be manufactured well, because the fine structure can be transferred with a high precision.

Figure 7:
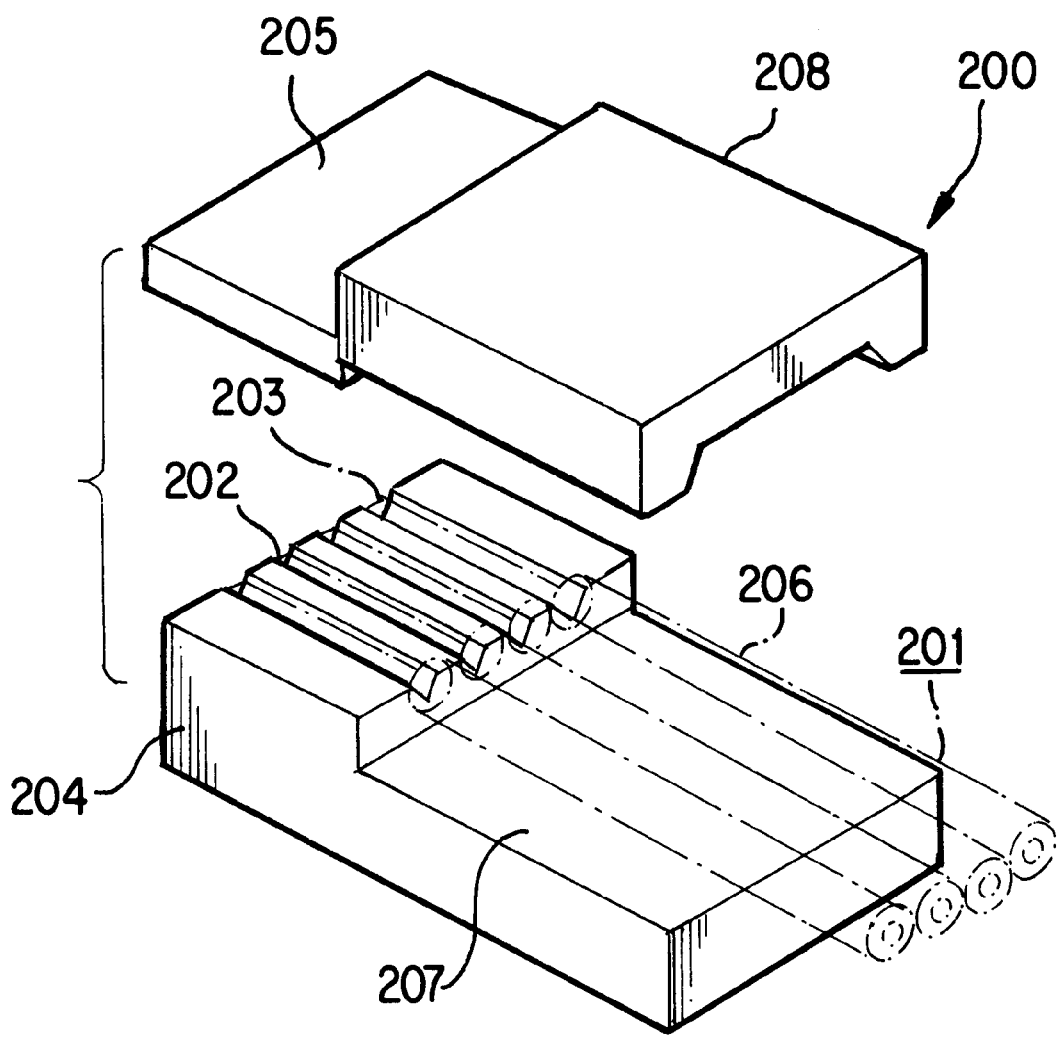
FIG. 7 is an illustration showing an optical fiber fixing member and a fiber fixing lid.

Hereinafter, in exemplifying a molding process for an optical fiber fixing member, this manufacturing process is further described in detail. A portion most requiring higher molding precision on the optical fiber fixing member is the optical fiber engagement portions. The optical fiber engagement portions are generally formed of, e.g., plural V-shaped grooves arranged parallel in a row as shown in FIG. 7, and the depth of the V-shaped groove is 100 to 200 micron meters while the space between the V-shaped grooves is about 250 micron meters. To form such V-grooves, used is a mold having V-shaped projections which are the reversed shape of the V-shaped grooves. When a glass is molded using such a mold, the V-shaped projections of the mold encroach the glass, and at the same time, the glass is filled in the recesses between V-shaped projections. However, if the recess is narrow and deep, it is not easy to fill the glass material the recesses as to obtain a required molding precision because filling the glass material into such fine portions is harder than filling the glass material into other portions. To fill the glass material into the V-shaped recess completely, the temperature of the lower mold as a mold having V-shaped projections has to be in a temperature range showing a viscosity of $10^{6.5}$ to $10^{9.5}$ poises, and the upper and side molds other than the lower mold are set to a temperature in a range such that a converted viscosity of the glass material at the temperature of the upper and side molds is 5 to 100 times higher than the viscosity of the glass material at the temperature of the lower mold. By this setting of the mold temperature, the viscosity of the glass material around the V-shaped projections is maintained at a good level thereby filling the glass material into the V-shaped recesses prior to other portions, and thereby enabling a complete glass filling. When the glass viscosity at a portion where the upper and side molds contact to each other is high, the pressure pushing the mold is effectively transmitted to the mold face of the V-shaped grooves, thereby improving the molding precision.

On the other hand, to suppress molding burrs, it is required to narrow the clearances between the side mold and the lower and upper molds as much as possible. Reduction of the clearance and no more than that, however, would not achieve the prevention of molding burrs. It is required to design that the glass having reached the clearance cannot encroach the inside of the clearance to fundamentally prevent molding burrs from occurring. More specifically, when the glass material reaches the clearances, the glass surface is cooled to reduce the fluidity of the glass material. However, it was difficult so far to reduce the glass' fluidity in estimating a timing at which the glass reaches the clearances.

To the contrary, with this invention, by setting the temperature of the upper and side molds to a temperature indicating that a converted viscosity of the glass material at the temperature of the upper and side molds is 5 to 100 times higher than the viscosity of the glass material at the temperature of the lower mold, and by decreasing the temperature of the lower mold at the same time that or after the glass product begins to be molded with pressure, the glass material successfully has a viscosity that the glass material will not enter in the clearance at a time that the glass material reaches the clearance.

However, if the temperature is controlled where the lower and side molds are in contact with each other likewise in a general positional relation between a side mold and upper and lower molds, the side mold's temperature may be increased by thermal conductance from the lower mold, and it becomes difficult to differentiate the temperatures between the side mold and the upper and lower molds. In this invented manufacturing method, in order to satisfy the conditions above, it is appropriate to control the temperature where the side mold and the lower mold are not in contact with each other, to control the temperature where a material having a small thermal conductivity is placed at a contact portion between the side mold and the lower mold to isolate influences of the thermal conductance, or to use the side mold made of a mold material having a small thermal conductivity.

As a method to avoid the side and lower molds from contacting with each other, the side mold and the upper mold are formed as a substantially united structure, which is separated from the lower mold over the lower mold. To make the substantially united structure means to make a united structured mold from the beginning or to form a united body mechanically after the side mold and the upper mold are formed respectively. As a method for unification, the upper mold and the side mold may be unified while the upper mold can slide in the side mold, or the upper mold and the side mold may be completely fixed.

If the glass material is molded with pressure under the conditions above, first, optical fiber engagement portions of a high temperature are formed, and then, the glass material gradually expands toward the side mold wall face. When the glass material reaches the side mold of a low temperature, the glass material loses the temperature of the material to the side mold, thereby reducing the temperature of the glass surface. The glass surface in contact with the side mold loses the fluidity as much to encroach the clearances. If the lower mold temperature is still maintained at a high temperature, the temperature of the mold clearances may increase due to thermal conductance from the lower mold because the side mold and the lower mold come to contact with each other at a later stage of the process for molding with pressure, and therefore, molding burrs may occur. To solve this problem, the lower mold's temperature is decreased in a midway of the process for molding with pressure, and thereby the temperature of the lower mold is made closer to the temperature of the side mold. It is to be noted that the temperature of the lower mold can be lowered while the temperature is strictly controlled, or can be lowered by contacting to the side mold that having been thermally strictly controlled at a lower temperature, without thermally controlling the lower mold's temperature in use of a feed back control.

As described above, at an initial stage of molding with pressure, the temperature of the mold for molding the optical fiber engagement portions is heated at a higher temperature than those of the side and upper molds. To give an adequate transformation ability to the glass preform to be pressurized, the glass preform is heated at a temperature almost the same as the temperature of the mold for molding the optical fiber engagement portions. Since the glass preform is generally heated on the lower mold, it is natural and desirable to assign the mold for molding the optical fiber engagement portions to the lower mold.

EXAMPLES

Hereinafter, in exemplifying a molding process for an optical fiber fixing member, a detailed molding method is described. In Examples, any viscosity of the glass material was measured in use of a pressurizing parallel plate viscosity meter.

First Example

A glass material containing 13.3 weight % $SiO_2$, 32.2 weight % $B_2O_3$, 44.5 weight % ZnO, 5.5 weight % $Al_2O_3$, and 4.5 weight % $Li_2O$, and 0.1 weight % $SnO_2$ as of externally mixed adding amount, was preliminarily formed with a high temperature to obtain a glass preform in a block shape having a width of 3.5 millimeters, a length of 10.5 millimeters, and a thickness of 2.05 millimeters with round corners. The vertical cross section of the glass preform indicated a rectangular except round corners, and the shape when viewed from the top side also indicated a rectangular except round corners. Accordingly, in the glass preform, a surface positioned perpendicular to a pressurizing direction at a time of molding with pressure (face extending perpendicular to a direction of the thickness of the glass preform) showed a flat surface. It is to be noted that the glass transition temperature of the glass material was 477 degrees Celsius and the sag temperature was 511 degrees Celsius. The mean thermal expansion coefficient from the room temperature to 400 degrees Celsius was $66.5 \times 10^{-7}$ $\deg^{-1}$, and the transparency of 350 nanometers wavelength ultraviolet ray at a thickness of 2 millimeters was 90 percent or more.

i. Description of Mold

A mold material having tungsten carbide as an essential component was used as a material for mold (having a mean thermal expansion coefficient from the room temperature to 400 degrees Celsius of $55 \times 10^{-7}$ $\deg^{-1}$), and a mold constituted of a upper mold, a lower mold, and a side mold was obtained. As shown in FIG. 1, the lower mold 2 constituting the mold 1 included a first molding portion 3 for forming optical fiber engagement portions for eight optical fibers placed parallel in a row made of V-shaped grooves, and a second molding portion 4 for forming, at an optical fiber guide block, a seat portion having the same width as the optical fiber guide block.

The first molding portion 3 was in a shape of a rectangular prism. Eight projections 3a each having a vertical cross section in an isosceles triangle shape in a transverse direction and a vertical cross section in a rectangular shape in a longitudinal direction, a length of 5 millimeters, a height of 170 millimeters, and a base width of 250 micron meters were formed at a upper end of the first molding portion 3 with a pitch of about 250 micron meters in parallel in a row in corresponding to the optical fiber engagement portions to be formed. A brim 3b to be engaged with a bottom face, when viewed during use, of the side mold 5 was formed except on a side contacting the second molding portion 4.

The second molding portion 4 also had a rectangular prism. The upper face of the second molding portion 4 was a flat face and projected upward (lower direction when viewed during use) by 250 micron meters from the upper surface, when viewed during use, of the first molding portion 3 (a flat face except the eight projections 3a). Accordingly, there was a stepwise gap on the border between the first molding portion 3 and the second molding portion 4. A brim 4a to be engaged with a bottom face, when viewed during use, of the side mold 5 was formed on a top end, when viewed during use, of the second molding portion 4 except on a side contacting the first molding portion 3.

Those first and second molding portions 3, 4 were separate members and made into a united body in a mechanical way by means of a fixing frame 6. The fixing frame 6 was fixed to each member by screws, not shown, made of the same material as the lower mold. The clearance between the first and second molding portions 3, 4 was 4 micron meters.

The side mold 5 was for forming side faces of the optical fiber guide block as a target by inner side faces of the side mold 5 and was a cylindrical body having a horizontal cross section in a rectangular frame shape. The side mold 5 had, at an inner side of the bottom end, engagement portions 5a engaging with the fixing frame 6. The inner size when the side mold 5 was viewed from the top was 5×12 millimeters. The upper mold 7 had a rectangular prism molding portion 7a for forming a bottom face of the target optical guide fiber block. The lower face, when viewed during use, of the molding portion 7a was a flat face. A brim 7b for stopping the top face, when viewed during use, of the side mold 5 was formed at a lower end, when viewed during use, of the molding portion 7a. When the glass was molded with pressure, the upper mold 7 was fixed on the side mold 5 as to form a mechanically unified body so that the brim 7b stops the top face of the side mold 5. As a result, the lower face of the molding portion 7a was positioned in an inner space of the side mold 5. The glass preform 8 was placed on the top face of the lower mold 2, while the glass was molded with pressure. The upper mold 7 and the side mold 5 entered from the top, when viewed during use, of the lower mold 2 down to a prescribed depth, or namely, until the bottom face of the side mold 5 was stopped by the brims 3b, 4a of the lower mold 2. The brims 3b, 4a of the lower mold 2 function as stoppers when the glass was molded with pressure.

A platinum alloy mold-releasing film 9 having a thickness of 500 angstroms was formed by a sputtering method on the top face of the first molding portion 3 and a side face extending from the top face to the top face of the brim 3b, on the top face of the second molding portion 4 and a side face extending from the top face to the top face of the brim 4a, on the inner side faces of the side mold 5 (including the surface of the engagement portions 5a), and on the lower face of the molding portion 7a and a side face extending from the lower face to the brim 7b, respectively. The size precision of the eight projections 3a having mold-releasing film 9 on the surface (precision in size with respect to the pitch and height) was within ±0.3 micron meter, and the flatness degrees of portions except the eight projections 3a in the upper face of the first molding portion 3, the upper face of the second molding portion 4, the inner side faces of the side mold 5, and the lower face of the molding portion 7a were, in any case, within 1.0 micron meter.

The mold 1 constituted of the lower mold 2, the side mold 5, and the upper mold 7 having the mold-releasing film 9 was fabricated so that clearances between the lower mold 2 and the side mold 5 and between the side mold 5 and the upper mold 7 were 6 micron meters, respectively, so that a distance between the top face (a flat face except the eight projections 3a) of the first molding portion 3 and the lower face of the molding portion 7a among distances between the upper and lower molds 7, 2 when the glass was molded with pressure was 1.5 millimeter, and so that a distance between the top face of the second molding portion 4 and the lower face of the molding portion 7a was 1.25 millimeter.

ii. Molding Method

The target optical fiber guide block was obtained by a molding with pressure in use of the mold I and the glass preform 8 as described above.

Figure 1B:
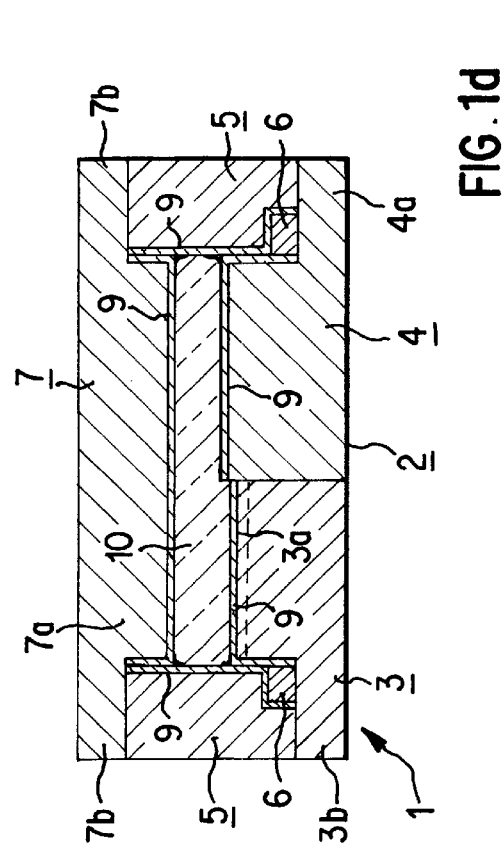

First, after the upper mold 7 and the side mold 5 were engaged so that the brim 7b of the upper mold 7 stopped at the top face of the side mold 5, the glass preform 8 was placed on the top face of the lower mold 2. The side mold 5 and the upper mold 7 were held a little upwardly away from the lower mold 2. FIG. 1(a) shows vertical cross sections in the transverse direction of the mold 1 and the glass preform at that time; FIG. 1(b) shows vertical cross sections in the longitudinal direction of the mold 1 and the glass preform at that time.

Figure 1C:
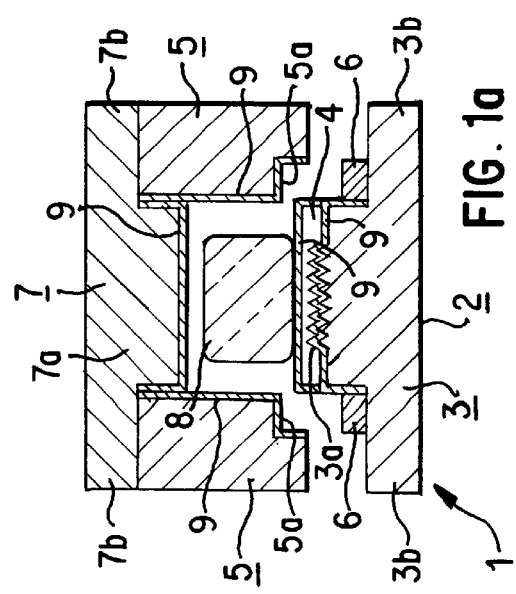
Figure 1D:
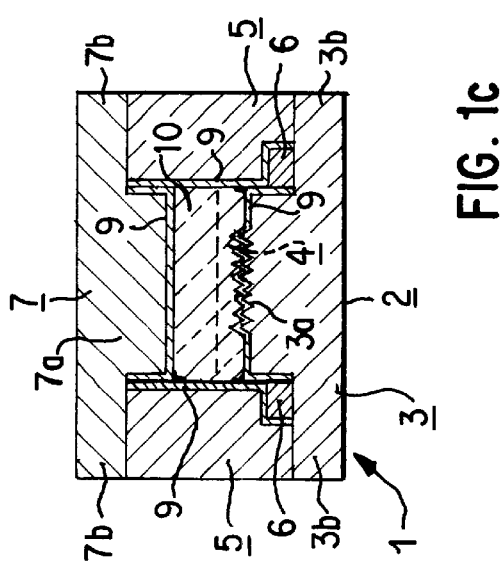

Then, the glass preform 8 disposed on the top face of the lower mold 2 thus described, as the preform 8 was on the mold 2, was heated in a nitrogen atmosphere so that the glass preform 8 was subject to temperature of 560 degrees Celsius (at that time, the viscosity of the glass was $10^8$ poises). Meanwhile, the side mold 5 and the upper mold 7 were heated up to 520 degrees is Celsius (corresponding to $10^{9.7}$ poises as a viscosity of the glass), which was 40 degrees lower than the lower mold, by another thermal controller and held at the temperature. Under this circumstance, the upper mold 7 and the side mold 5 were pressed toward the lower mold 2 with a molding pressure of 250 kgf/cm$^2$ from the top side of the upper mold 7, and the temperature of the lower mold began to be decreased at the same time that the pressure was applied. Before the lower end of the side mold 5 came in contact with the lower mold, after the temperature of the lower mold was lowered to 525 degrees Celsius (corresponding to $10^{9.5}$ poises as a viscosity of the glass), the glass was molded until the lower end face of the side mold 5 engages the brim 3b of the lower mold 2. FIG. 1(c) shows vertical cross sections in the transverse direction of the mold 1 and the product 10 at that time; FIG. 1(d) shows vertical cross sections in the longitudinal direction of the mold 1 and the product 10 at that time.

The pressure was subsequently reduced to 100 kgf/cm$^2$, and then application of the pressure was stopped after the mold was cooled down to the glass transition temperature. Then, the product 10 was released from the mold 1 upon cooled to the room temperature. The obtained product was an optical fiber guide block (hereinafter "optical fiber guide block 10") having on one face of the block, as shown in FIG. 2, optical fiber engagement portions 11 for eight optical fiber made from V-shaped grooves each arranged in parallel having a length of 5 millimeters, a depth of 170 micron meters, and a top end width of 250 micron meters, and a seat portion 12 formed at a lower position than the top face of the optical fiber engagement portions 11. The optical fiber guide block 10 had a width of 5 millimeters, a length of 12 millimeters, and a maximum thickness of 1.5 millimeter; the width of the seat portion 12 was the same as the width of the optical fiber guide block 10. The corners corresponding to the clearances between the lower mold 2 and the side mold 5, between the upper mold 7 and the side mold 5, and between the first and second molding portions 3, 4 of the lower mold 2, among corners of the optical fiber guide block 10 did not have any molding burrs and were made of very small free surfaces. The vertical cross section around the optical connection side end of the optical fiber guide block 10 was exactly rectangular except the V-shaped grooves at the optical fiber engagement portions 11.

ii. Measurement and Evaluation of Precision

The precision in size of the optical fiber engagement portion 11 formed on the optical fiber guide block 10 was measured in the following manner.

First, a contour measurement apparatus (Contour Record 2600C (trade name) made by Tokyo Seimitsu Corp.) of exploring needle type having a needle of a 25-micron-meter curvature tip was used. The needle of the contour measurement apparatus was scanned in a direction perpendicular to the longitudinal direction of the optical fiber engagement portions 11 to pick up contour coordinates of the respective optical fiber engagement portions 11 and their vicinity, and the obtained contour was displayed on a monitor. As shown in FIG. 3, circles 15 having a diameter of 125 micron meters corresponding to an outer diameter of quartz type single mode optical fiber were inserted virtually one by one in the respective optical fiber engagement portions 11 on the monitor, and center coordinates of the respective circles 15 when the circles 15 contact the two slopes of each optical fiber engagement portion were sought.

Based on the center coordinates of the respective circles 15, sought were distances (single pitch) $l_1$ to $l_7$ between two circles 15 adjacent to each other and precision in size thereof (single pitch precision), distances (accumulated pitch) from a center of the circle 15 virtually inserted in the optical fiber engagement portion 11 located leftmost side in the transverse direction of the optical fiber guide block 10 to a center of a circle 15 and precision in size thereof (accumulated pitch precision), and vertical distances $d_1$ to $d_8$ between the center of each circle 15 and a plane including a top face 16 of an edge on a right side in the transverse direction of the optical fiber engagement portions 11 and precision in size thereof (depth precision).

Similarly, with respect to the eight projections 3a formed at the first molding portion 3 of the lower mold 2 for forming the optical fiber engagement portions 11, sought were single pitches $1_1$ to $1_7$ and precision in size thereof, accumulated pitches $L_1$ to $L_7$ and precision in size thereof, and heights (depths) corresponding to the vertical distances $d_1$ to $d_8$ and precision in size thereof. It is to be noted that with respect to any of the optical fiber engagement portions 11 and the projection 3a formed at the first molding portion 3, the designed value of the single pitch $1_1$ to $1_7$ was 250 micron meters, and the designed value of the depth (or height for the projection 3a) $d_1$ to $d_8$ was 52.8 micron meters.

Any of the single pitch precision, the accumulated pitch precision, and the depth precision of the optical fiber guide block 10 was within ±0.3 micron meter, which suggests that the size precision of the obtained optical fiber guide block 10 was high. We have confirmed that molding was implemented under a high transfer precision because any of the size precision of the single pitch $1_1$ to $1_7$, the size precision of the accumulated pitch $L_1$ to $L_7$, and the size precision of the heights $d_1$ to $d_8$ with respect to the eight projections 3a formed at the first molding portion 3 of the lower mold 2 was within ±0.3 micron meter. Since process scratches originally made at V-shaped groove fabrication of the mold were transferred to summit portions of the V-shaped projections of the optical fiber engagement portions 11, we also have confirmed that filling the glass material into the V-shaped recesses of the mold was done completely.

The optical fiber guide block 10 having the size precision thus described was suitable for a component of an optical fiber array for optically connecting, with ±1-micron meter alignment precision, tape fibers (thickness was about 400 micron meters) in which eight quartz type single mode optical fibers each having an outer diameter of 125 micron meter were arranged parallel in a row with a pitch of 250 micron meters.

iv. Continuous Molding Operation

Molding with the pressure under the same condition was repeated 500 times or more using the same mold as described above.

As a result, the mold did not raise any problem. Any of the optical fiber guide blocks formed during this continuous operation had no molding burr or no impaired precision in size or shape.

Example 2

As shown in FIG. 4, the side mold 5 and upper mold 7 were separated from each other, and the side mold 5 was engaged with the lower mold 2 through a heat insulator made of zirconia ceramic. The upper mold 7 was suspended over the side mold 5 lightly apart from the side mold 5. Although the structure of the mold was different from that in Example 1, the sizes of the lower, side, and upper molds, and mold-releasing film were common in Examples 1, 2. A glass preform 8 substantially the same as that used for Example 1 was placed on the lower mold 2, and a target optical fiber guide block was obtained by molding with pressure implemented in the following manner.

Then, the glass preform 8 disposed on the top face of the lower mold 2 thus described, as the preform 8 was on the lower mold 2, was heated in a nitrogen atmosphere so that the glass preform 8 was subject to temperature of 560 degrees Celsius (at that time, the viscosity of the glass was $10^8$ poises). Meanwhile, the side mold 5 and the upper mold 7 were heated up to 520 degrees Celsius (corresponding to $10^{9.7}$ poises as a viscosity of the glass), which was 40 degrees lower than the lower mold, by another thermal controller and held at the temperature. Under this circumstance, the upper mold 7 was pressed toward the side mold 5 with a molding pressure of 230 kgf/cm² from the top side of the upper mold 7, and the temperature of the lower mold began to be decreased at the same time that the pressure was applied. Before the upper end of the side mold 5 came in contact with the upper mold 7, the temperature of the lower mold was lowered to 520 degrees Celsius (corresponding to $10^{9.7}$ poises as a viscosity of the glass), and then, the glass was molded with pressure until the upper end face of the side mold 5 engages the brim 7b of the upper mold 7. FIG. 4(c) shows vertical cross sections in the transverse direction of the mold 1 and the product 10 at that time; FIG. 4(d) shows vertical cross sections in the longitudinal direction of the mold 1 and the product 10 at that time.

The pressure was subsequently reduced to 100 kgf/cm², and then application of the pressure was stopped after the mold was cooled down to the glass transition temperature. Then, the product 10 was released from the mold 1 upon cooled to the room temperature. The obtained product 10 was an optical fiber guide block having on one face of the block, as shown in FIG. 2, optical fiber engagement portions 11 for eight optical fiber made from V-shaped grooves each arranged in parallel having a length of 5 millimeters, a depth of 170 micron meters, and a top end width of 250 micron meters, and a seat portion 12 formed at a lower position than the top face of the optical fiber engagement portions 11. The optical fiber guide block 10 had a width of 5 millimeters, a length of 12 millimeters, and a maximum thickness of 1.5 millimeter; the width of the seat portion 12 was the same as the width of the optical fiber guide block 10. The corners corresponding to the clearances between the lower mold 2 and the side mold 5, between the upper mold 7 and the side mold 5, and between the first and second molding portions 3, 4 of the lower mold 2, among corners of the optical fiber guide block 10 did not have any molding burrs and were made of very small free surfaces. The free surface herein means a surface of the glass not contacting with the mold during molding with pressure. The vertical cross section around the optical connection side end of the optical fiber guide block 10 was exactly rectangular except the V-shaped grooves at the optical fiber engagement portions 11.

Measurement and Evaluation of Precision

The precision in size of the optical fiber engagement portion 11 formed on the optical fiber guide block 10 was measured in the following manner.

Any of the single pitch precision, the accumulated pitch precision, and the depth precision of the optical fiber guide block 10 was within ±0.3 micron meter, which suggests that the size precision of the obtained optical fiber guide block 10 was high. We have confirmed that molding was implemented under a high transfer precision because any of the size precision of the single pitch $1_1$ to $1_7$, the size precision of the accumulated pitch $L_1$ to $L_7$, and the size precision of the heights $d_1$ to $d_8$ with respect to the eight projections 3a formed at the first molding portion 3 of the lower mold 2 was within ±0.3 micron meter. Since process scratches originally made at V-shaped groove fabrication of the mold were transferred to summit portions of the V-shaped projections of the optical fiber engagement portions 11, we also have confirmed that filling the glass material into the V-shaped recesses of the mold was done completely.

The optical fiber guide block 10 having the size precision thus described was suitable for a component of an optical fiber array for optically connecting, with ±1-micron meter alignment precision, tape fibers (thickness was about 400 micron meters) in which eight quartz type single mode optical fibers each having an outer diameter of 125 micron meter were arranged parallel in a row with a pitch of 250 micron meters.

Example 3

Optical fiber guide blocks were fabricated in the same manner as Example 1 except molding conditions shown in Table 1.

The obtained optical fiber guide blocks 10 each had the same size precision as Example 1 and was suitable for a component of an optical fiber array for optically connecting, with ±1-micron meter alignment precision, tape fibers (thickness was about 400 micron meters) in which eight quartz type single mode optical fibers each having an outer diameter of 125 micron meter were arranged parallel in a row with a pitch of 250 micron meters.

TABLE 1

| | Upper & side molds' temperature (° C.) | Lower mold's temperature (° C.) Pre-pressure/post-pressure | Pressure while molding (kg/cm$^2$) | Pressure while slowly cooled (kg/cm$^2$) |
|---|---|---|---|---|
| 1 | 530($10^{9.3}$) | 545($10^{8.6}$)/525($10^{9.5}$) | 280 | 100 |
| 2 | 530($10^{9.3}$) | 550($10^{8.3}$)/530($10^{9.3}$) | 200 | 100 |
| 3 | 535($10^{9.1}$) | 555($10^{8.2}$)/535($10^{9.1}$) | 160 | 100 |
| 4 | 540($10^{8.8}$) | 560($10^{8.0}$)/540($10^{8.8}$) | 120 | 80 |
| 5 | 540($10^{8.8}$) | 570($10^{7.5}$)/535($10^{9.1}$) | 90 | 50 |
| 6 | 535($10^{9.1}$) | 580($10^{7.3}$)/535($10^{9.1}$) | 80 | 50 |

(Note: numbers in parentheses for the upper, side, lower molds indicate the glass viscosity [poises] at that temperature.)

Example 4

Figure 5B:
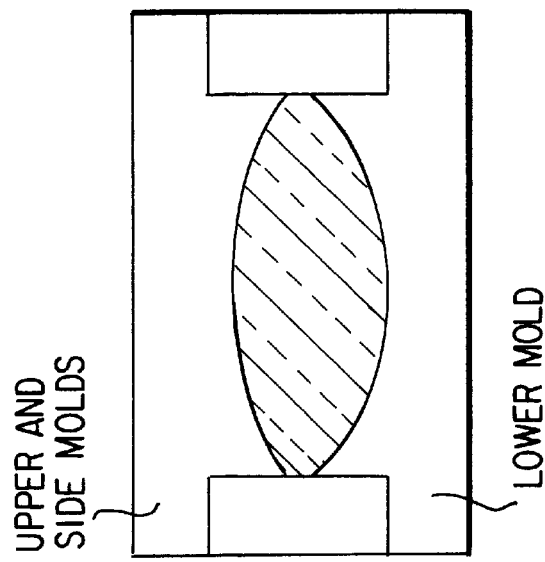
FIG. 5 is an illustration showing a mold used for a molding method according to the invention and the molding method itself.
Figure 5A:
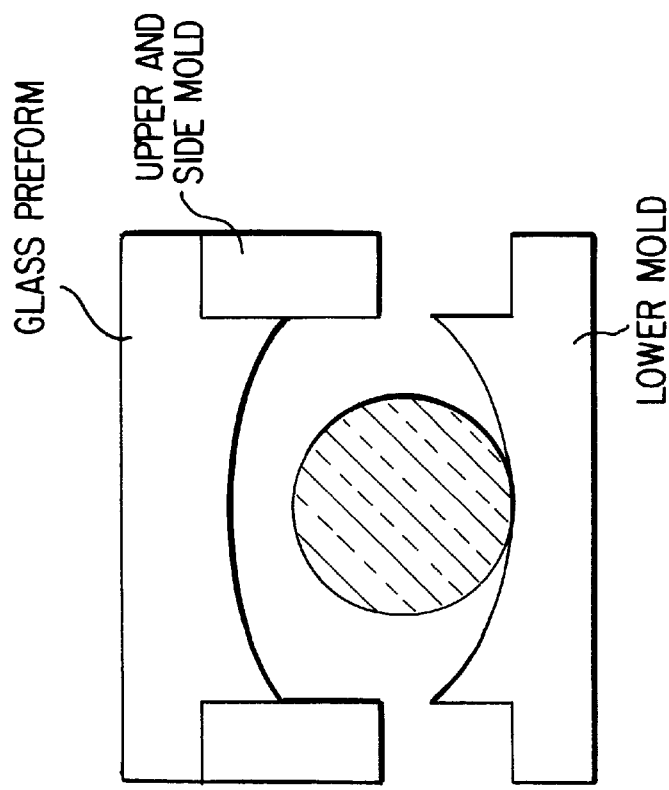
Figure 6B:
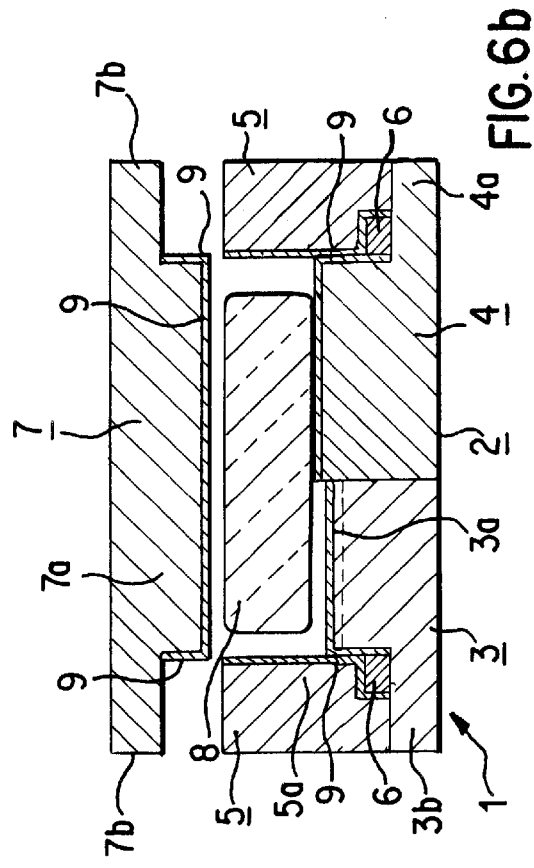
FIGS. 6(a) to 6(d) are illustrations showing a mold used for a molding method according to a comparative example and the molding method itself.
Figure 6A:
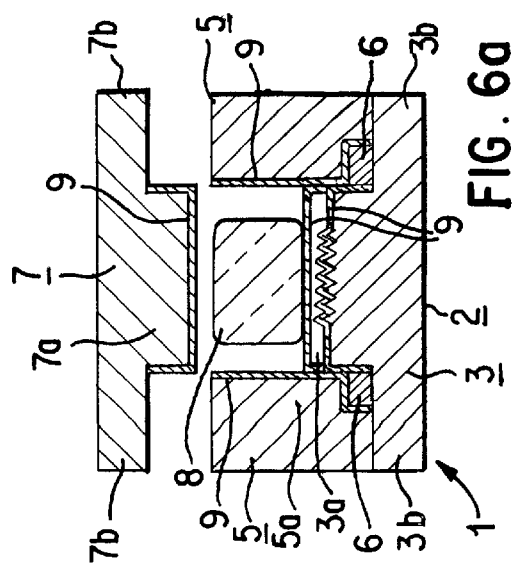
Figure 6D:
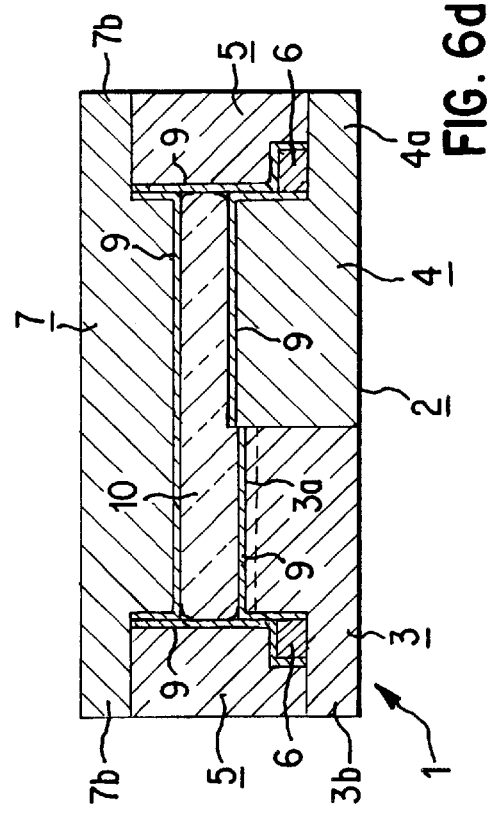
Figure 6C:
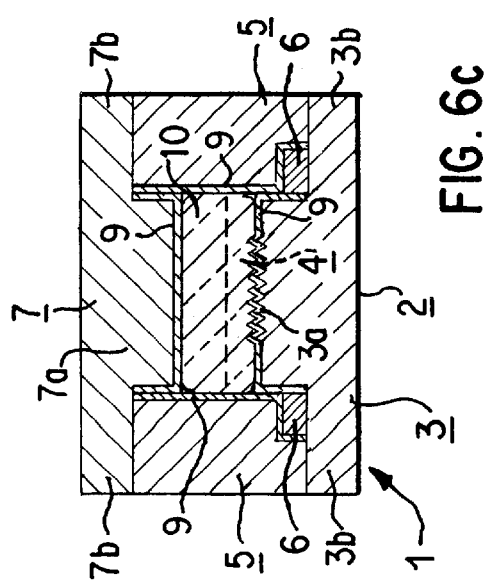

A spherical glass preform was obtained by molding with a high temperature the glass material having the same components as Example 1. The mold was made of tungsten carbide as an essential component, and the molded surface of the lens had a platinum ally mold-releasing film of 1500 angstroms on the surface. The mold was as shown in FIG. 5 consisted of lower, side, and upper molds; the side and upper molds were made in a united structure; and the side and upper molds were disposed on the lower mold. The mold was designed to mold an aspherical convex lens having a diameter of 22 millimeters, a center thickness of 10 millimeters, and a thickness at outer edge of 1.5 millimeter The lens radius of curvature on the lower mold side was 16.9 millimeters, when converted as a spherical lens, and on the upper mold side was 22 millimeters.

The glass preform was put on the lower mold as shown in FIG. 5 and heated in a nitrogen atmosphere while the upper and side molds as united were disposed over and apart form the lower mold. Using respective thermal controllers, the lower mold was held at 560 degrees Celsius (at that time, the glass viscosity was $10^{8.0}$ poises), and the side and upper molds were held at 520 degrees Celsius (at that time, the glass viscosity was $10^{9.5}$ poises). The upper and side molds were then pushed toward the lower mold with molding pressure of 150 kg/cm$^2$, and the temperature of the lower mold began to be decreased at the same time that the pressure began to apply. The temperature of the lower mold was lowered to 520 degrees Celsius (at that time, the glass viscosity was $10^{9.5}$ poises) before the lower end of the side mold contacts to the engagement portion of the lower mold, and then, the glass was molded with pressure until the lower end of the side mold contacts to the engagement portion of the lower mold. Subsequently, the molding pressure was reduced to 80 kg/cm$^2$, and the application of the pressure was stopped after the glass was cooled to the glass transition temperature. Then, a lens produced upon cooling to the room temperature was taken out of the mold. Since the volume of the glass preform was set to nearly the same volume of the cavity of the mold, the free surface due to failure to filling the glass material fully, ordinarily findable at the outer edge of a lens, was 100 micron meters or less, very small, and furthermore, no molding burr was found. According to this method, the optical effective face can be taken with a maximum size, and compact optical systems are available when the lens is used.

Comparative Example 1

As shown in FIG. 6, a mold and a glass preform exactly the same as those in Example 2 were used except no zirconia insulator was placed between the lower mold 2 and the side mold 5, and a target optical fiber guide block was obtained by the same method as in Example 2.

That is, the glass preform 8 disposed on the top face of the lower mold 2, as the preform 8 was on the lower mold 2, was heated in a nitrogen atmosphere so that the glass preform 8 was held subject to temperature of 550 degrees Celsius (at that time, the viscosity of the glass was $10^{8.3}$ poises).

Meanwhile, the side mold 5 and the upper mold 7, which were engaged with the lower mold 2, were heated up to 520 degrees Celsius (corresponding to $10^{9.7}$ poises as a viscosity of the glass), which was 30 degrees lower than the lower mold, by another thermal controller and held at the temperature.

The temperature around the side mold's contact portion to the lower mold was increased up to 545 degrees Celsius due to thermal conductance from the lower mold, the temperature of the entire side mold could not be controlled to 520 degrees Celsius. Under this circumstance, the upper mold 7 was pressed toward the side mold 5 with a molding pressure of 200 kgf/cm$^2$ from the top side of the upper mold 7, and the temperature of the lower mold began to be decreased at the same time that the pressure was applied. Before the upper end of the side mold 5 came in contact with the brim 7b of the upper mold 7, the temperature of the lower mold was lowered to 520 degrees Celsius (corresponding to $10^{9.7}$ poises as a viscosity of the glass), and then, the glass was molded with pressure until the upper end face of the side mold 5 engages the brim 7b of the upper mold 7.

The corners corresponding to the clearances between the upper mold 7 and the side mold 5, and between the first and second molding portions 3, 4 of the lower mold 2, among corners of the obtained optical fiber guide block 10, did not have any molding burrs and were made of very small free surfaces causing no practical problem. Small molding burrs, however, occurred at the clearance between the lower mold 2 and the side mold 5. The vertical cross section around the optical connection side end of the optical fiber guide block 10 was exactly rectangular except the V-shaped grooves at the optical fiber engagement portions 11 and the molding burrs.

Measurement and Evaluation of Precision

The precision in size of the optical fiber engagement portion 11 formed on the optical fiber guide block 10 was measured in the same manner as above.

Any of the single pitch precision, the accumulated pitch precision, and the depth precision of the optical fiber guide block 10 was within ±0.3 micron meter, which suggests that the size precision of the obtained optical fiber guide block 10

19 was high. We have confirmed that molding was implemented under a high transfer precision because any of the size precision of the single pitch $1_1$ to $1_7$, the size precision of the accumulated pitch $L_1$ to $L_7$, and the size precision of the heights $d_1$ to $d_8$ with respect to the eight projections $3a$ formed at the first molding portion 3 of the lower mold 2 was within ±0.3 micron meter. Since process scratches originally made at V-shaped groove fabrication of the mold were transferred to summit portions of the V-shaped projections of the optical fiber engagement portions 11, we also have confirmed that filling the glass material into the V-shaped recesses of the mold was done completely.

The optical fiber guide block 10 having the size precision thus described was usable for a component of an optical fiber array for optically connecting, with ±1-micron meter alignment precision, tape fibers (thickness was about 400 micron meters) in which eight quartz type single mode optical fibers each having an outer diameter of 125 micron meter were arranged parallel in a row with a pitch of 250 micron meters, but requires removals of the molding burrs prior to use.

Comparative Example 2

A target optical fiber glass guide block was obtained with exactly the same mold, glass preform, and conditions as Example 1, except that the temperature of the lower mold was held constantly to 560 degrees Celsius during molding with pressure.

The corners corresponding to the clearances between the upper mold 7 and the side mold 5, and between the first and second molding portions 3, 4 of the lower mold 2, among corners of the obtained optical fiber guide block 10, did not have any molding burrs and were made of very small free surfaces causing no practical problem. Small molding burrs, however, occurred at the clearance between the lower mold 2 and the side mold 5. The vertical cross section around the optical connection side end of the optical fiber guide block 10 was exactly rectangular except the V-shaped grooves at the optical fiber engagement portions 11 and the molding burrs.

Measurement and Evaluation of Precision

The precision in size of the optical fiber engagement portion 11 formed on the optical fiber guide block 10 was measured in the same manner as above.

Any of the single pitch precision, the accumulated pitch precision, and the depth precision of the optical fiber guide block 10 was within ±0.3 micron meter, which suggests that the size precision of the obtained optical fiber guide block 10 was high. We have confirmed that molding was implemented under a high transfer precision because any of the size precision of the single pitch $1_1$ to $1_7$, the size precision of the accumulated pitch $L_1$ to $L_7$, and the size precision of the heights $d_1$ to $d_8$ with respect to the eight projections $3a$ formed at the first molding portion 3 of the lower mold 2 was within ±0.3 micron meter. Since process scratches originally made at V-shaped groove fabrication of the mold were transferred to summit portions of the V-shaped projections of the optical fiber engagement portions 11, we also have confirmed that filling the glass material into the V-shaped recesses of the mold was done completely.

The optical fiber guide block 10 having the size precision thus described was usable for a component of an optical fiber array for optically connecting, with ±1-micron meter alignment precision, tape fibers (thickness was about 400 micron meters) in which eight quartz type single mode optical fibers each having an outer diameter of 125 micron meter were

20 arranged parallel in a row with a pitch of 250 micron meters, but requires removals of the molding burrs prior to use.

The foregoing description of preferred embodiments of the invention has been presented for purposes of illustration and description, and is not intended to be exhaustive or to limit the invention to the precise form disclosed. The description was selected to best explain the principles of the invention and their practical application to enable others skilled in the art to best utilize the invention in various embodiments and various modifications as are suited to the particular use contemplated. It is intended that the scope of the invention not be limited by the specification, but the be defined claims set forth below.

What is claimed is:

1. A manufacturing method for a glass product, comprising the steps of:

placing a glass material in a cavity defined by, at least, a lower mold and an upper mold, either one of which has in addition to inherent surface roughness a fine structure having a prescribed shape for transferring a fine structure having the reverse of said shape onto the glass product;

molding the glass material in the cavity with pressure into the glass product in so controlling that the glass material has a viscosity range of $10^{6.5}$ to $10^{9.5}$ poises at the beginning of said molding with pressure, that the mold having the fine structure is at a temperature in a range such that the glass material has a viscosity range of $10^{6.5}$ to $10^{9.5}$, and that the mold not having the fine structure is at a temperature in a range such that the glass material has a viscosity 5 to 100 times higher than the viscosity of the glass material at the temperature of the mold having the fine structure.

2. The manufacturing method according to claim 1, wherein the mold having the fine structure is the lower mold.

3. The manufacturing method according to claim 1, wherein the glass product is an optical fiber fixing member.

4. The manufacturing method according to claim 3, wherein the lower mold has a molding face for molding an optical fiber engagement portion of an optical fiber fixing member, and the upper mold has a molding face for molding a bottom of the optical fiber fixing member.

5. A method for manufacturing an optical fiber array comprising the steps of:

placing a glass material in a cavity defined by, at least, a lower mold and an upper mold, either one of which has a fine structure for transferring the structure of an optical fiber engagement portion of an optical fiber fixing member to the glass material;

molding the glass material in the cavity with pressure into the optical fiber array in so controlling that the glass material has a viscosity range of $10^{6.5}$ to $10^{9.5}$ poises at the beginning of said molding with pressure, that the mold having the fine structure is at a temperature in a range such that the glass material has a viscosity range of $10^{6.5}$ to $10^{9.5}$, and that the mold not having the fine structure is at a temperature in a range such that the glass material has a viscosity 5 to 100 times higher than the viscosity of the glass material at the temperature of the mold having the fine structure; and fixing an end of an optical fiber with an adhesive by means of the optical fiber engagement portion of the optical fiber fixing member and a fiber fixing lid.

* * * * *